United States Patent [19]
Turner

[11] Patent Number: 5,394,898
[45] Date of Patent: Mar. 7, 1995

[54] VALVE BOX ADAPTER

[76] Inventor: Frank J. Turner, P.O. Box 20741, Raleigh, N.C. 27619

[21] Appl. No.: 198,360

[22] Filed: Apr. 13, 1994

[51] Int. Cl.$^6$ ............................................. F16L 5/00
[52] U.S. Cl. .................................... 137/371; 137/364; 404/26
[58] Field of Search .................... 137/364, 371; 404/26

[56] References Cited

U.S. PATENT DOCUMENTS

| 4,187,647 | 2/1980 | Hall | 404/26 |
| 4,976,568 | 12/1990 | Hess | 404/26 |
| 5,221,155 | 6/1993 | Neil | 404/26 |

Primary Examiner—A. Michael Chambers

[57] ABSTRACT

A valve box adapter formed of plastics material is provided by molding as a unit an interior member. The valve box cover is elevated by the adapter from the old pavement level to a new pavement level. Plastics are utilized which will not melt at the application temperature of asphalt but will soften somewhat to conform more precisely to the configuration of the adapter cover. A plurality of adapters may be used in multiple applications to enable the continuous use of the original valve box cover as a plurality of asphalt levels are added over a period of time.

6 Claims, 3 Drawing Sheets

VALVE BOX ADAPTER

BACKGROUND OF THE INVENTION

1. Field of the Invention

The present invention relates generally to typical curb valve boxes having an upper opening for receiving a valve box cover and in particular with a valve box adapter usable with the curb valve box to elevate the cover to a new pavement level.

2. Description of the Prior Art

A common requirement in street paving is an extender or adapter for typical curb valve boxes protecting and securing cutoffs and meters below street level. In many cases, a metal extender ring of the necessary thickness is welded to the top of the valve box to raise the level of the cover as required. Other techniques include utilization of screw-threaded extender rings. These techniques are generally effective to accomplish the desired result but in many instances are expensive or require considerable installation labor. Moreover, such rings sometimes break under heavy traffic or otherwise become loose as a result of vibration. See, for example, U.S. Pat. Nos. 4,325,405; 3,408,778; and 3,533,199.

While these improvements are in common use, it is oftentimes necessary to raise the level of the manhole cover even more by utilizing shims beneath the ground ring. This technique requires removal of the soil around the ring to permit installation of the shims and its replacement thereafter. Again, this procedure is involved and labor intensive.

Thus there is a need for a relatively inexpensive and more reliable way of elevating valve box covers to preselected pavement levels that permits expeditious installation and provides a relatively vibrationless unit.

OBJECTIVES AND SUMMARY OF THE INVENTION

An objective of the invention is to provide a vertically adjustable valve box cover extender whereby a valve box cover can be raised to the level of a newly-resurfaced road.

Another objective of the invention is to provide a valve box cover adapter of the type described having means for mounting it on a conventional curb valve box.

A further objective of the invention is to provide a valve box cover extender of the type described having means to restrain lateral movement of the cover.

Yet still another objective of the invention is to provide a valve box cover adapter of the type described that is simple in construction, inexpensive to manufacture, and highly effective in operation.

The foregoing objectives are accomplished by the provision of a valve box cover extender having an upper opening for receiving a valve box cover and a bottom with a centrally disposed opening affording exterior access to the valve assembly for operating the valve or reading a positioned meter. Four substantially vertical side walls extend upwardly from the bottom and terminate flush with the surface of the street. The valve box cover has a top and four downwardly extending side walls normally supported on portions of the bottom of the upper valve box opening. Each of the extender vertical side walls includes an upper side wall extending to the upper opening and the level of newly-laid pavement. Each upper side wall has an intermediate inwardly recessed surface for supporting the valve box cover and substantially flat upper and lower surfaces. Each side wall also has an obliquely disposed outer surface joining the inner edge of the upper surface and the outer edge of the lower surface, the outer side wall surfaces conforming generally to the shape and dimensions of the valve box opening and the inner edges of the lower surfaces being arcuate and defining a circular opening providing access to the valve box assembly.

These and other objects and advantages of the present invention will become more apparent after consideration of the following detailed description taken in conjunction with the accompanying drawings wherein like characters of reference designate like parts throughout the several views.

DETAILED DESCRIPTION OF THE PREFERRED EMBODIMENT

Figure 1:
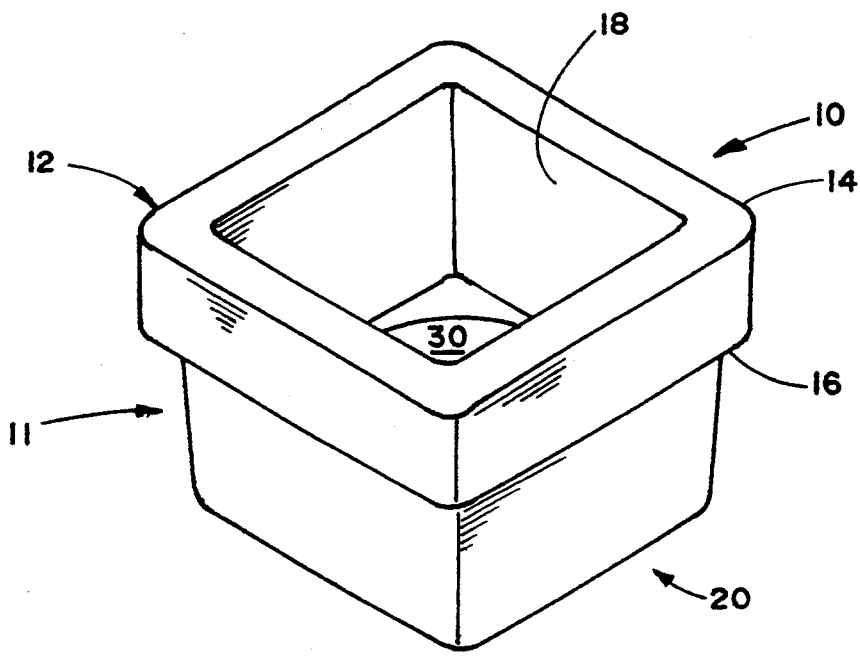
FIG. 1 is a perspective view of the valve box extender comprising the present invention showing the vertical side walls and the bottom with a circular opening.

Referring now to the drawings and in particular to FIG. 1, a valve box extender shown generally as 10 includes four substantially vertical side walls 11 each having an upper rectangularly shaped rim 12 with an upper edge 14, a lower edge 16 and an inwardly tapering wall 18. A lower rectangularly shaped rim 20 within side wall 11 has an upper edge 22, a lower edge 24 and an inwardly tapering outer wall 26. An intermediate portion 28 connects upper rim 12 with lower rim 20.

Figure 2:
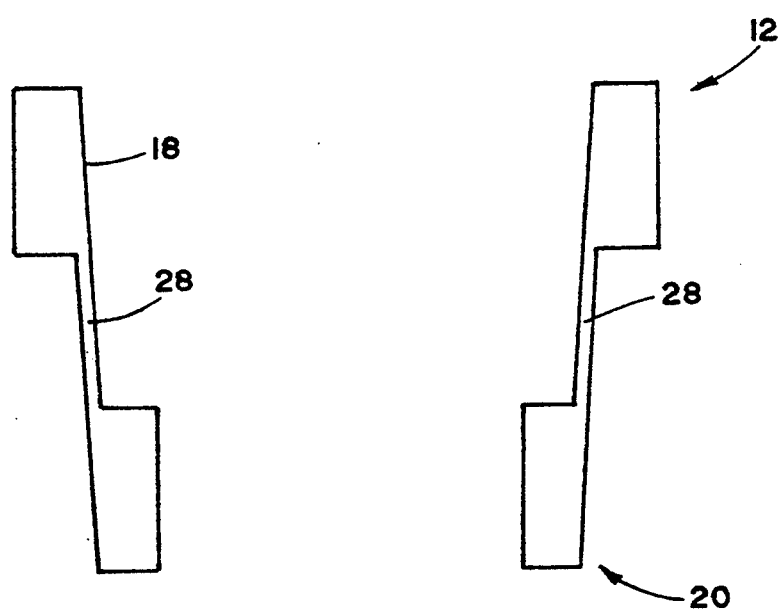
FIG. 2 is a side elevational, sectional view of one embodiment of the extender shown in FIG. 1.
Figure 3:
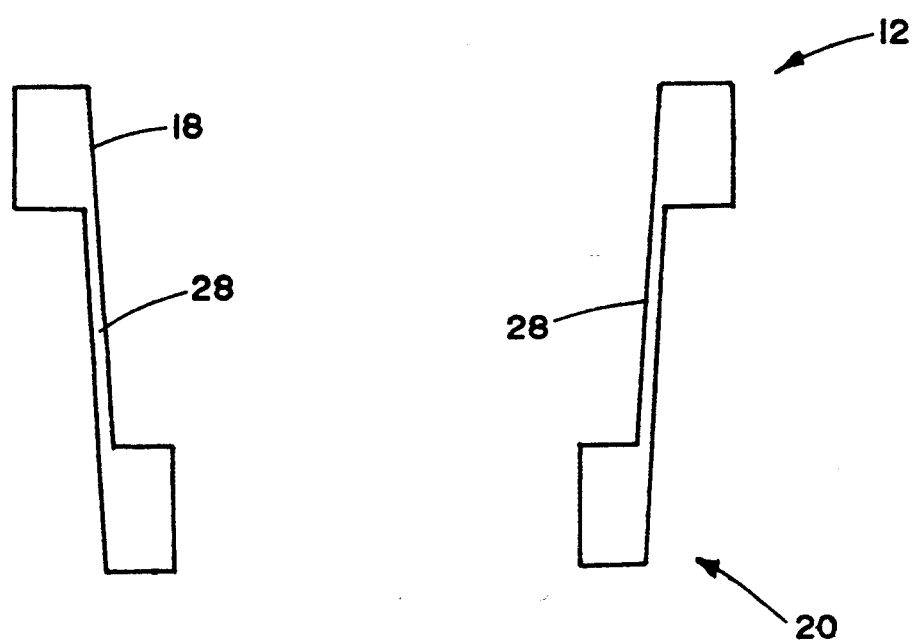
FIG. 3 is a side elevational, sectional view of another embodiment of the adapter shown in FIG. 1.
Figure 4:
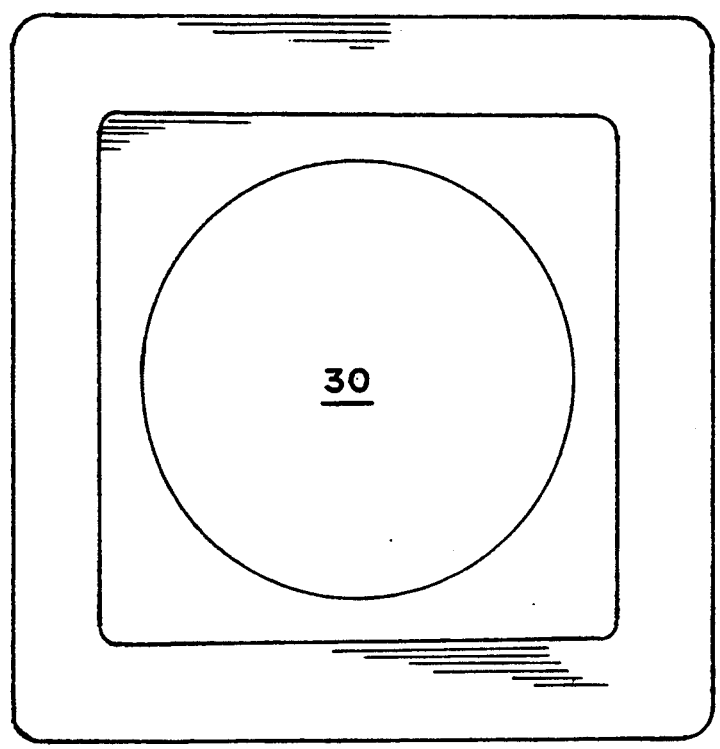
FIG. 4 is a plan view of the adapter shown in FIG. 1.

A circular opening 30 in closure member 25 along lower edge 24 of lower rectangularly shaped rim 20 provides access to the valve box assembly. Various heights for wall 18 of upper rim 12 may be used to accommodate a number of commonly utilized valve boxes required by public utilities. Two embodiments having different heights are shown in FIGS. 2 and 3.

Intermediate portion 28 is rectangularly shaped and has a defined width separating the upper rectangularly shaped rim and the lower rectangularly shaped rim by a distance determined sufficient to maintain box cover 38 level with the surface. Intermediate portion 28 is thin in comparison to the thickness of both the upper rim 12 and lower rim 20 as can best be seen in FIG. 5. While relatively thin in thickness, intermediate portion 28, because it is formed of four straight walls, has suitable strength for use in the configuration shown.

Figure 5:
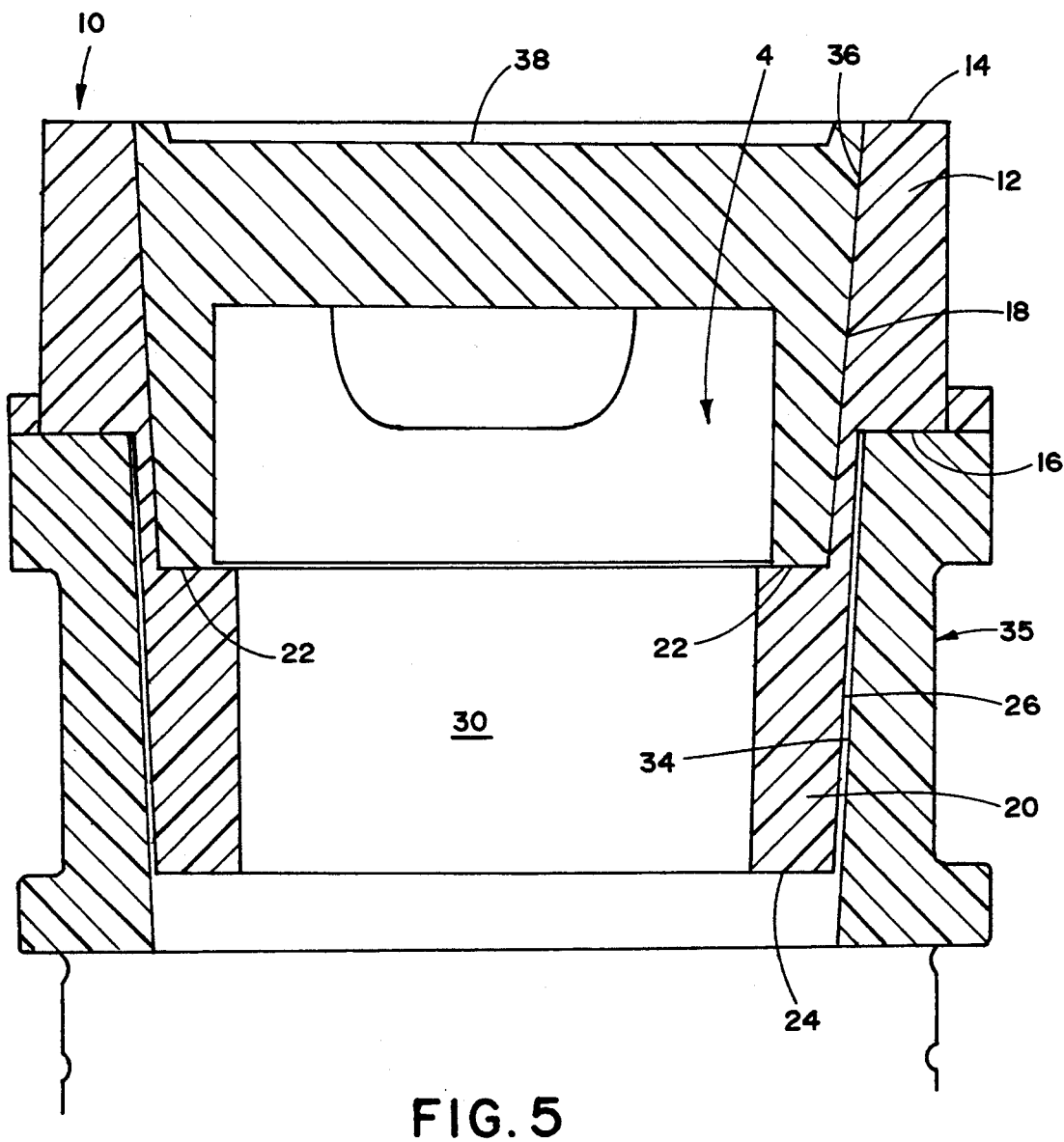
FIG. 5 is a side elevational, sectional view of the adapter comprising the present invention utilized with a typical curb valve box to elevate the valve box cover.

The utilization of the adapter comprising the present invention is best shown in FIG. 5 wherein in adapter 10, the inwardly tapering outer wall 26 of lower rim 20 is positioned adjacent the inwardly tapering inner wall 34 of the valve box 35. When so positioned, the inwardly tapering wall 18 of upper rim 12 is contiguous with the outwardly tapering wall 36 of the valve box cover 38. When the adapter is appropriately sized and positioned, several can be used in multiple applications to establish varying street levels over a period of time as the street is periodically resurfaced.

The adapter is preferably formed of a plastic material such as polypropylene with a melting point in the range of 500° F. Asphalt paving materials are usually applied to roads at about 300° F. and thus will not melt the adapter upon application.

Thus it can be seen that disadvantages of prior art valve box adapters have been overcome in the present inventive concept. With respect to the description provided, it is to be realized that the optimum dimensional relationship for the parts of the invention, to include variations in size, materials, shape, form, function and manner of operation, assembly and use, are deemed readily apparent and obvious to one skilled in the art. All equivalent relationships to those illustrated in the drawings and described in the specification are intended to be encompassed herein.

The foregoing is therefore considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. A valve box extender formed of plastic material for use in curb valve boxes to receive and adjust the height of a valve box cover having a downwardly extending and inwardly tapering outer wall and inner wall, the extender comprising: an upper rectangularly shaped rim having an upper edge, a lower edge, and an inwardly tapering inner wall, the lower edge engaging the valve box; a lower rectangularly shaped rim having an upper edge, a lower edge, and an inwardly tapered outer wall; an intermediate rectangularly shaped portion connecting the upper rim with the lower rim; and a closure member affixed to the lower edge of the lower rectangularly shaped rim forming a floor, the closure member having a circular opening therein, the intermediate rectangularly shaped portion having a defined width and including inner and outer walls maintaining the upper rectangularly shaped rim a predetermined distance from the lower rectangularly shaped rim, the inwardly tapering rim of the upper rim being continuous with the outwardly tapering wall of the valve box cover and the inwardly tapering outer wall of the lower rim being contiguous with the inwardly tapering inner wall of the valve box so that the valve box cover can be used with the extender in multiple applications.

2. The valve box extender as claimed in claim 1 wherein the plastic material is polypropylene.

3. The valve box extender as claimed in claim 1 wherein the plastic material is polyamide.

4. The valve box extender as claimed in claim 1 wherein the extender is integrally formed.

5. The valve box extender as claimed in claim 2 wherein the extender is integrally formed.

6. The valve box extender as claimed in claim 3 wherein the extender is integrally formed.

* * * * *